US006983155B1

(12) United States Patent
Cook

(10) Patent No.: US 6,983,155 B1
(45) Date of Patent: Jan. 3, 2006

(54) PROVIDING GEOGRAPHIC DIRECTIONS TO A DESTINATION USING A MOBILE WIRELESS COMMUNICATION DEVICE

(75) Inventor: Fred S. Cook, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 443 days.

(21) Appl. No.: 10/224,149

(22) Filed: Aug. 20, 2002

(51) Int. Cl.
*H04Q 7/20* (2006.01)

(52) U.S. Cl. .............................. 455/456.1; 455/456.2; 455/457; 342/357.06

(58) Field of Classification Search ............. 455/456.1, 455/456.2, 456.3, 456.5, 457; 342/357.06
See application file for complete search history.

(56) References Cited

U.S. PATENT DOCUMENTS

| 5,108,052 A | * | 4/1992 | Malewicki et al. ............ 246/5 |
| 5,857,156 A | | 1/1999 | Anderson |
| 5,991,601 A | | 11/1999 | Anderson |
| 6,036,086 A | | 3/2000 | Sizer, II et al. |
| 6,122,520 A | * | 9/2000 | Want et al. ............... 455/456.2 |
| 2002/0133545 A1 | * | 9/2002 | Fano et al. .................. 709/203 |
| 2003/0054830 A1 | * | 3/2003 | Williams et al. ............ 455/456 |
| 2003/0115288 A1 | * | 6/2003 | Ljubicich et al. ........... 709/219 |
| 2003/0231755 A1 | * | 12/2003 | Akhteruzzaman et al. ...................... 379/218.01 |
| 2004/0220726 A1 | * | 11/2004 | Jin et al. ..................... 701/207 |

OTHER PUBLICATIONS

"Vehicle Tracking Systems from Radio Satellite—AVL Vehicle Tracking Using GPS" http://www.radsat.com/vtracksystemleft.htm.
"What is OnStar: Route Support" http://www.onstar.com/visitors/html/ao_rout_support.htm.

* cited by examiner

*Primary Examiner*—Erika A. Gary

(57) ABSTRACT

A mobile wireless communication device is disclosed comprised of a reading system, a control system, and a user interface system. The reading system reads destination data for a destination from an object if the object is positioned in proximity to the reading system. The control system processes the destination data to generate geographic directions to the destination. The user interface system provides the geographic directions to a user to facilitate guiding the user to the destination.

52 Claims, 8 Drawing Sheets

PROVIDING GEOGRAPHIC DIRECTIONS TO A DESTINATION USING A MOBILE WIRELESS COMMUNICATION DEVICE

BACKGROUND OF THE INVENTION

1. Field of the Invention

The invention is related to the field of communication systems, and in particular, to providing geographic directions to a destination using a mobile wireless communication device based on data read from an object.

2. Statement of the Problem

People carry cellular phones, Personal Communications Service (PCS) phones, Personal Digital Assistants (PDA), and other portable devices on a daily basis. These portable devices hold information that people access frequently. For instance, cell phones can store a list of names, addresses, and numbers that a person can refer to. PDAs provide a variety of features such as an address book, a calendar, and an electronic note book. These portable devices can be handy when people travel locally and over long distances.

Although a cell phone and PDA may be able to store an address of an entity, such as a restaurant, hotel, or an office building, a person may not know how to get to that address. An address in a large city such as New York or Chicago may be difficult to find, especially for travelers. Unfortunately, cell phones and PDAs have not been effectively adapted to provide directions to a person so that the person can find their way to the destination address.

Systems currently exist that are able to provide directions. For instance, the MapQuest web site allows a person to enter a starting location and a destination. MapQuest provides suggested directions from the starting location to the destination. A person that has a portable computer with a wireless modem can access the MapQuest web site from remote locations to get directions to a destination. Unfortunately, the person has to know the name of the destination, the address of the destination, and other information specific to the destination in order to receive the service. The person also has to manually enter the destination information which may be time consuming and prone to error. The person also has to carry a portable computer, which is much larger and more cumbersome than a cell phone or a PDA.

Another system that provides directions to people is OnStar. Some vehicles are equipped with an OnStar communication system. From a vehicle, a person is able to access the OnStar control center to ask for directions to a destination. The OnStar communication system in the vehicle determines the location of the vehicle via satellite signals. The OnStar communication system in the vehicle then transmits the location of the vehicle to the OnStar control center. The OnStar control center determines the location of the destination in relation to the location of the vehicle and transmits a signal to the vehicle with directions to the destination. There are other systems that function similarly to OnStar. Unfortunately, the person has to be in the vehicle to access the OnStar service. Also, the person may have to know the name of the destination, the address of the destination, and other information specific to the destination in order to receive the service.

Some portable devices are equipped with scanners for scanning bar codes, such as is disclosed in U.S. Pat. No. 6,036,086 ('086), which avoids the hassle of manually entering data. '086 describes a telephone that is equipped with a bar code scanner. Using the telephone, a person can scan an advertisement in a magazine to capture transaction information. The transaction information could be a telephone number for the advertising entity or information about an advertised product. The telephone can automatically initiate a transaction using the transaction information. '086 unfortunately does not teach providing directions to a user so that the user can find their way to a destination.

SUMMARY OF THE SOLUTION

The invention helps solve the above problems by providing geographic directions using a mobile wireless communication device based on data read from a tangible object. The invention advantageously provides directions to a person through a mobile wireless communication device commonly carried by that person to assist in guiding the person to a destination. Reading the data from the object is advantageously easier for a user and virtually eliminates human error of manually entering the data. The invention may also allow hotels, restaurants, and other businesses to include information on business cards that can be automatically read by the mobile wireless communication device to provide directions to the business, specials offered by the business, news on the business, weather in the business area, etc.

One embodiment of the invention comprises a mobile wireless communication device comprised of a reading system, a control system, and a user interface system. The reading system reads destination data for a destination from an object if the object is positioned in proximity to the reading system. The control system processes the destination data to generate geographic directions to the destination. The geographic directions comprise any information indicating a location of the destination, such as directions to the destination, street directions to the destination, and/or a map for illustrating a location of the destination or directions to the destination. The user interface system provides the geographic directions to a user to facilitate guiding the user to the destination.

Another embodiment of the invention comprises a communication system comprised of a mobile wireless communication device and a network system. The mobile wireless communication device reads destination data for a destination from an object if the object is positioned in proximity to the mobile wireless communication device. The mobile wireless communication device transfers the destination data over a wireless link. The network system receives the destination data over the wireless link. The network system processes the destination data to generate geographic directions to the destination. The network system transfers the geographic directions over the wireless link. The mobile wireless communication device displays the geographic directions to a user to facilitate guiding the user to the destination.

Another embodiment of the invention comprises a communication network comprised of a communication interface system and a control system. The communication interface system receives a request for geographic directions from a mobile wireless communication device over a wireless link. The request includes a destination phone number for a destination. The control system processes the destination phone number to determine a location of the destination. The control system processes the location of the destination to generate the geographic directions. The communication interface system then transmits the geographic directions to the mobile wireless communication device over the wireless link. The mobile wireless communication device provides the geographic directions to a user to facilitate guiding the user to the destination.

The invention also includes other embodiments and examples that are described below.

DESCRIPTION OF THE DRAWINGS

The same reference number represents the same element on all drawings.

DETAILED DESCRIPTION OF THE INVENTION

FIGS. 1–8 and the following description depict specific examples of the invention to teach those skilled in the art how to make and use the best mode of the invention. For the purpose of teaching inventive principles, some conventional aspects of the invention have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
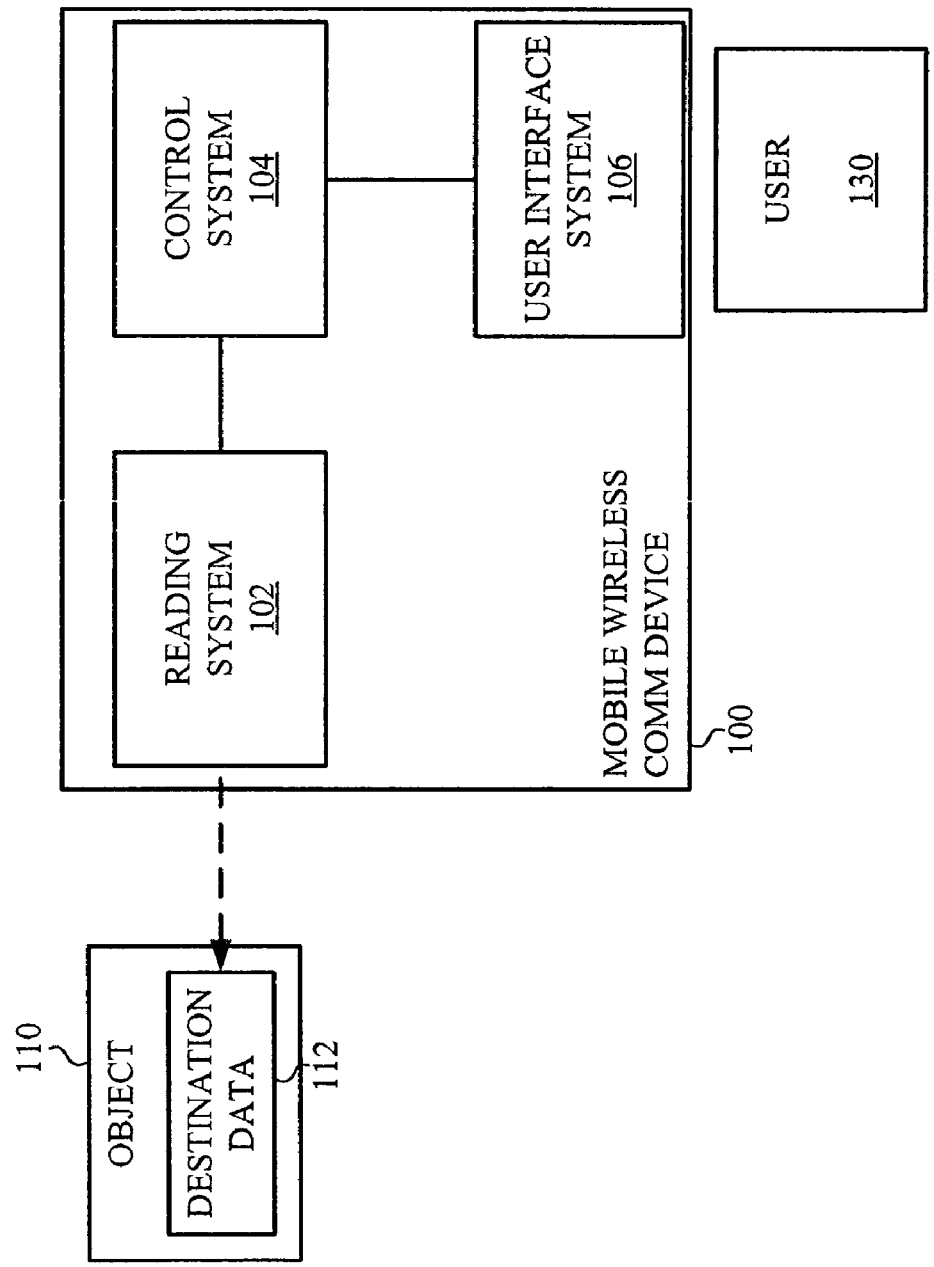
FIG. 1 illustrates a mobile wireless communication device for providing geographic directions in an example of the invention.

Mobile Wireless Communication Device—FIG. 1

FIG. 1 illustrates a mobile wireless communication device 100 for providing geographic directions in an example of the invention. The mobile wireless communication device 100 is comprised of a reading system 102, a control system 104, and a user interface system 106. FIG. 1 further includes tangible object 110 that can be read by mobile wireless communication device 100. Tangible object 110 includes destination data 112 for a destination (not shown).

To better understand this and other examples, the following definitions may be helpful. A destination comprises any place a person may go, such as a restaurant, a hotel, a department store, a mall, a theater, or some other business entity. Destination data comprises any information that indicates the destination, such as an address, a telephone number, an e-mail address, satellite coordinates, a Global Positioning System (GPS) value, and/or a zip code plus four extra digits. Geographic directions comprise any information indicating a location of the destination or how to guide a person to the destination, such as street directions to the destination, a map for illustrating a location of the destination or directions to the destination, audio directions via waypoint controls, control instructions, and/or reference points. A mobile wireless communication device comprises any portable device, system, or apparatus configured to communicate via wireless signals and whose physical shape is small enough to be operated as a hand-held device. Examples of mobile wireless communication device include a cellular phone, a PCS phone, and a Personal Digital Assistant (PDA). A tangible object comprises any physical material that destination data can be written, encoded, or stored on, such as a business card, a coupon, or an advertisement in a magazine, newspaper, etc.

For this example, assume that user 130 needs to go to a destination (not shown) and wants to get directions to the destination. User 130 possesses mobile wireless communication device 100 and has access to tangible object 110. To get directions, user 130 operates mobile wireless communication system 100 as follows.

Reading system 102 reads destination data 112 from object 110 if object 110 is positioned in proximity to reading system 102. User 130 may control reading system 102 by pressing a switch to have reading system 102 read destination data 112. Reading system 102 may also automatically read destination data 112 if object 110 is positioned in the proximity. Reading system 102 may also read destination data 112 after receiving a signal, such as an audio command. Control system 104 processes destination data 112 to generate geographic directions to the destination. User interface system 106 provides the geographic directions to user 130 to facilitate guiding user 130 to the destination. User interface system 106 may be any audio or visual interface, display, or Graphical User Interface (GUI). Based on this disclosure, those skilled in the art will appreciate how to modify existing mobile wireless communication devices to make mobile wireless communication device 100.

Destination data 112 may be written, printed, encoded, or stored on object 110 in a variety of ways. Destination data 112 may be encoded on a bar code in which case reading system 102 would read destination data 112 from the bar code. Destination data 112 may be encoded on a magnetic strip in which case reading system 102 would read destination data 112 from the magnetic strip. Destination data 112 may be stored on a Radio Frequency Integrated Circuit (RFIC) in which case reading system 102 would read destination data 112 from the RFIC.

In some embodiments of the invention, the location of mobile wireless communication device 100 is important in addition to the location of the destination. For instance, in one embodiment, control system 104 determines a location of mobile wireless communication device 100. Control system 104 may determine the location of mobile wireless communication device 100 based on satellite signals, such as Global Positioning System (GPS) signals. Control system 104 processes the location of mobile wireless communication device 100 and destination data 112 to generate the geographic directions. The geographic directions could be a map for illustrating the location of mobile wireless communication device 100 and a location of the destination. The geographic directions could be suggested directions between the location of mobile wireless communication device 100 and the destination. The geographic directions could also be audio directions between the location of mobile wireless communication device 100 and the destination.

Control system 104 may communicate with other systems or networks to generate the geographic directions. For instance, in one embodiment, control system 104 transfers a request to a communication network (not shown). The request includes destination data 112 and/or a location of mobile wireless communication device 100. Control system 104 receives a response from the communication network. Control system 104 processes the response to generate the geographic directions.

Figure 2:
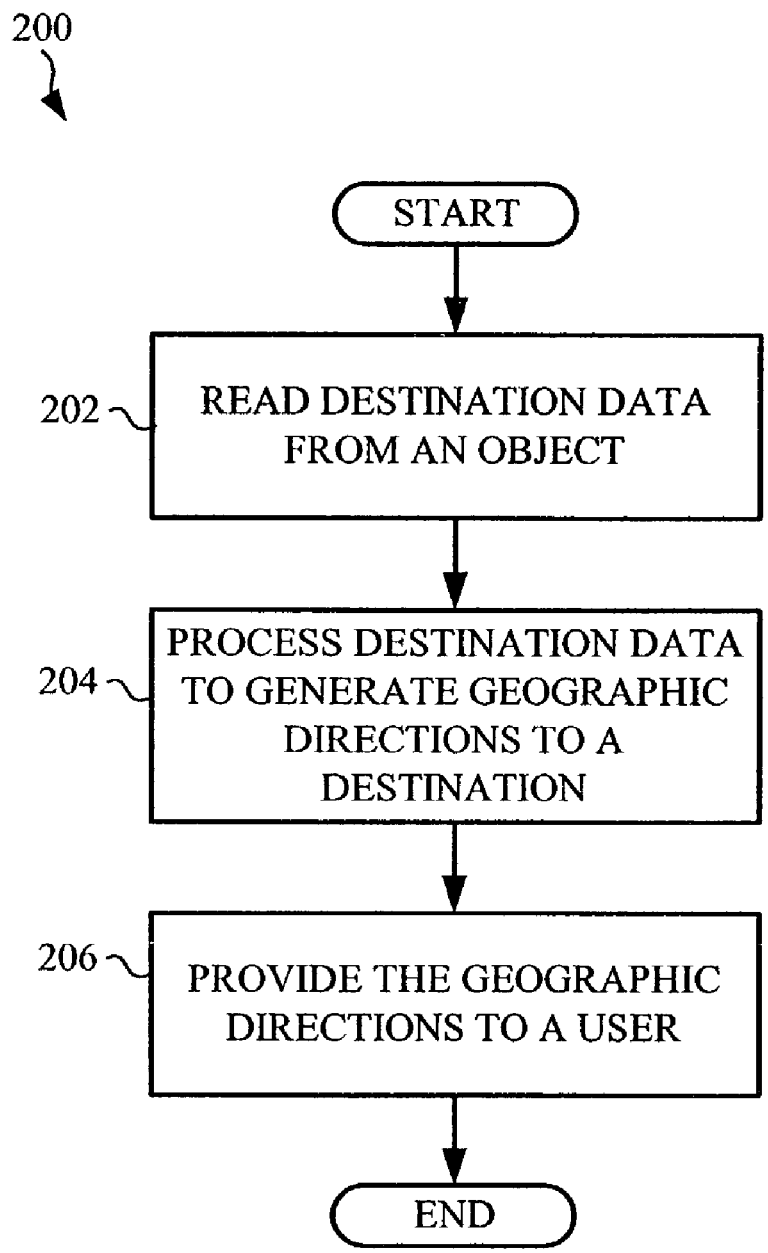
FIG. 2 is a flow chart illustrating a method of operating a mobile wireless communication device to provide geographic directions in an example of the invention.

Method of Operating a Mobile Wireless Communication Device—FIG. 2

FIG. 2 illustrates a method 200 of operating a mobile wireless communication device to provide geographic directions in an example of the invention. The mobile wireless communication device in this example may be mobile wireless communication device 100 illustrated in FIG. 1. Reference numbers corresponding to FIG. 2 are in parenthesis.

For this method, the mobile wireless communication device reads destination data for a destination from a tangible object if the object is positioned in a proximity to the mobile wireless communication device (202). The mobile wireless communication device processes the destination data to generate geographic directions to the destination (204). The mobile wireless communication device provides the geographic directions to a user of the mobile wireless communication device to facilitate guiding the user to the destination (206).

In some embodiments of the invention, the location of the mobile wireless communication device is important in addition to the destination data. For instance, in one embodiment, the mobile wireless communication device determines a location of the mobile wireless communication device. The mobile wireless communication device may determine the location of the mobile wireless communication device based on satellite signals, such as GPS signals. The mobile wireless communication device processes the location of the mobile wireless communication device and the destination data to generate the geographic directions. The geographic directions could be a map for illustrating the location of the mobile wireless communication device and a location of the destination. The geographic directions could also be suggested directions between the location of the mobile wireless communication device and the destination. The geographic directions could also be audio directions between the location of the mobile wireless communication device and the destination. The geographic direction could also illustrate "fixed" location objects to help direct a user, such as signs, landmarks, etc.

The mobile wireless communication device may communicate with other systems or networks to generate the geographic directions. For instance, in one embodiment, the mobile wireless communication device transfers a request to a communication network. The request includes the destination data and/or the location of the mobile wireless communication device. The mobile wireless communication device receives a response from the communication network. The mobile wireless communication device processes the response to generate the geographic directions.

Figure 3:
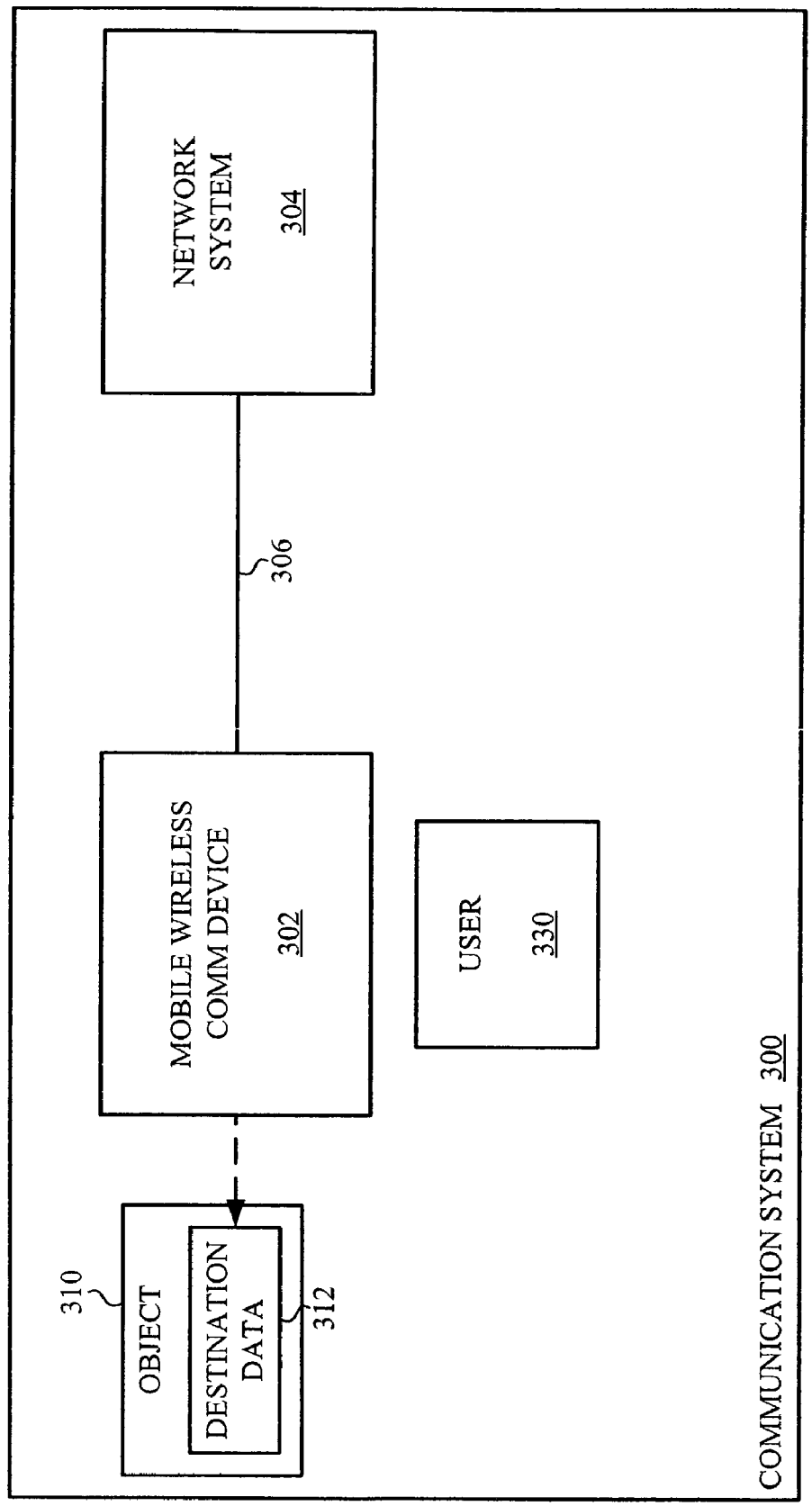
FIG. 3 illustrates a communication system for providing geographic directions in an example of the invention.

Communication System—FIG. 3

FIG. 3 illustrates a communication system 300 for providing geographic directions in an example of the invention. Communication system 300 includes a mobile wireless communication device 302 and a network system 304. FIG. 3 also includes tangible object 310 that can be read by mobile wireless communication device 302. Tangible object 310 includes destination data 312 for a destination.

For this example, assume that user 330 needs to go to a destination (not shown) and wants to get directions to the destination. User 330 possesses mobile wireless communication device 302 and has access to object 310. To provide directions to user 330, communication system 300 operates as follows.

Mobile wireless communication device 302 reads destination data 312 from object 310 if object 310 is positioned in proximity to mobile wireless communication device 302. Mobile wireless communication device 302 transfers destination data 312 over a wireless link 306. Network system 304 receives destination data 312 over wireless link 306. Network system 304 processes destination data 312 to generate geographic directions to the destination. Network system 304 transfers the geographic directions over the wireless link 306. Mobile wireless communication device 302 receives the geographic directions. Mobile wireless communication device 302 displays the geographic directions to user 330 to facilitate guiding user 330 to the destination. Mobile wireless communication device 302 may display the geographic directions using any audio or visual interface, display, or Graphical User Interface (GUI). Based on this disclosure, those skilled in the art will appreciate how to modify existing communication systems to make communication system 300.

Destination data 312 may be written, printed, encoded, or stored on object 310 in a variety of ways. Destination data 312 may be encoded on a bar code in which case mobile wireless communication device 302 would read destination data 312 from the bar code. Destination data 312 may be encoded on a magnetic strip in which case mobile wireless communication device 302 would read destination data 312 from the magnetic strip. Destination data 312 may be stored on a Radio Frequency Integrated Circuit (RFIC) in which case mobile wireless communication device 302 would read destination data 312 from the RFIC.

In some embodiments of the invention, the location of mobile wireless communication device 302 is important in addition to destination 312. For instance, in one embodiment, mobile wireless communication device 302 determines a location of mobile wireless communication device 302. Mobile wireless communication device 302 may determine the location of mobile wireless communication device 302 based on satellite signals, such as GPS signals. Mobile wireless communication device 302 transfers the location of mobile wireless communication device 302 over wireless link 306. Network system 304 processes destination data 312 and the location of mobile wireless communication device 302 to generate the geographic directions. The geographic directions could be a map for illustrating the location of mobile wireless communication device 302 and a location of the destination. The geographic directions could be suggested directions between the location of mobile wireless communication device 302 and the destination. The geographic directions could also be audio directions between the location of mobile wireless communication device 302 and the destination. The geographic direction could also illustrate "fixed" location objects to help direct a user, such as signs, landmarks, etc.

Figure 4:
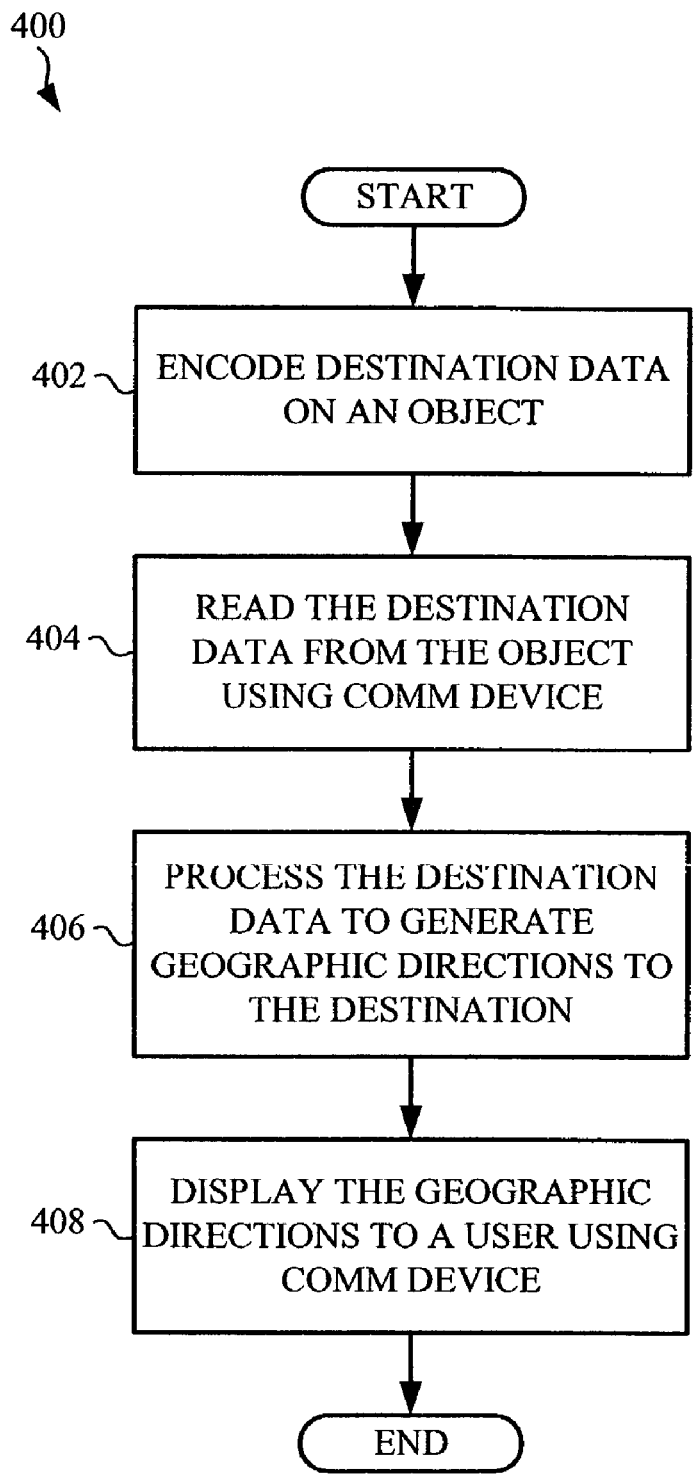
FIG. 4 is a flow chart illustrating a method of operating a communication system to provide geographic directions in an example of the invention.

Method of Operating a Communication System—FIG. 4

FIG. 4 illustrates a method 400 for providing geographic directions in an example of the invention. Method 400 may use communication system 300 illustrated in FIG. 3. Reference numbers corresponding to FIG. 4 are in parenthesis.

For this example, assume that a user has access to a tangible object that includes destination data. The destination data was previously encoded on the tangible object. Encoding the destination data on the object could be accomplished using a bar code, a magnetic strip, an RFIC, or some other means. When operated by a user, a mobile wireless communication device reads the destination data for the destination from the object if the object is positioned in proximity to the mobile wireless communication device (402). The mobile wireless communication device transmits the destination data over a wireless link (404). A network system receives the destination data. The network system processes the destination data to generate geographic directions to the destination (406). The network system transmits the geographic directions over the wireless link (408). The mobile wireless communication device then displays the geographic directions to the user to facilitate guiding the user to the destination (410).

In some embodiments, the mobile wireless communication device, or another system may process the destination data to generate the geographic directions.

In some embodiments of the invention, the location of the mobile wireless communication device is important in addition to the destination data. For instance, in one embodiment, the mobile wireless communication device determines a location of the mobile wireless communication device. The mobile wireless communication device may determine the location of the mobile wireless communication device based on satellite signals, such as GPS signals. The mobile wireless communication device transmits the destination data and the location of mobile wireless communication device to the network system to generate the geographic directions. The geographic directions could be a map for illustrating the location of the mobile wireless communication device and a location of the destination. The geographic directions could also be suggested directions between the location of the mobile wireless communication device and the destination. The geographic directions could also be audio directions between the location of the mobile wireless communication device and the destination.

Figure 5:
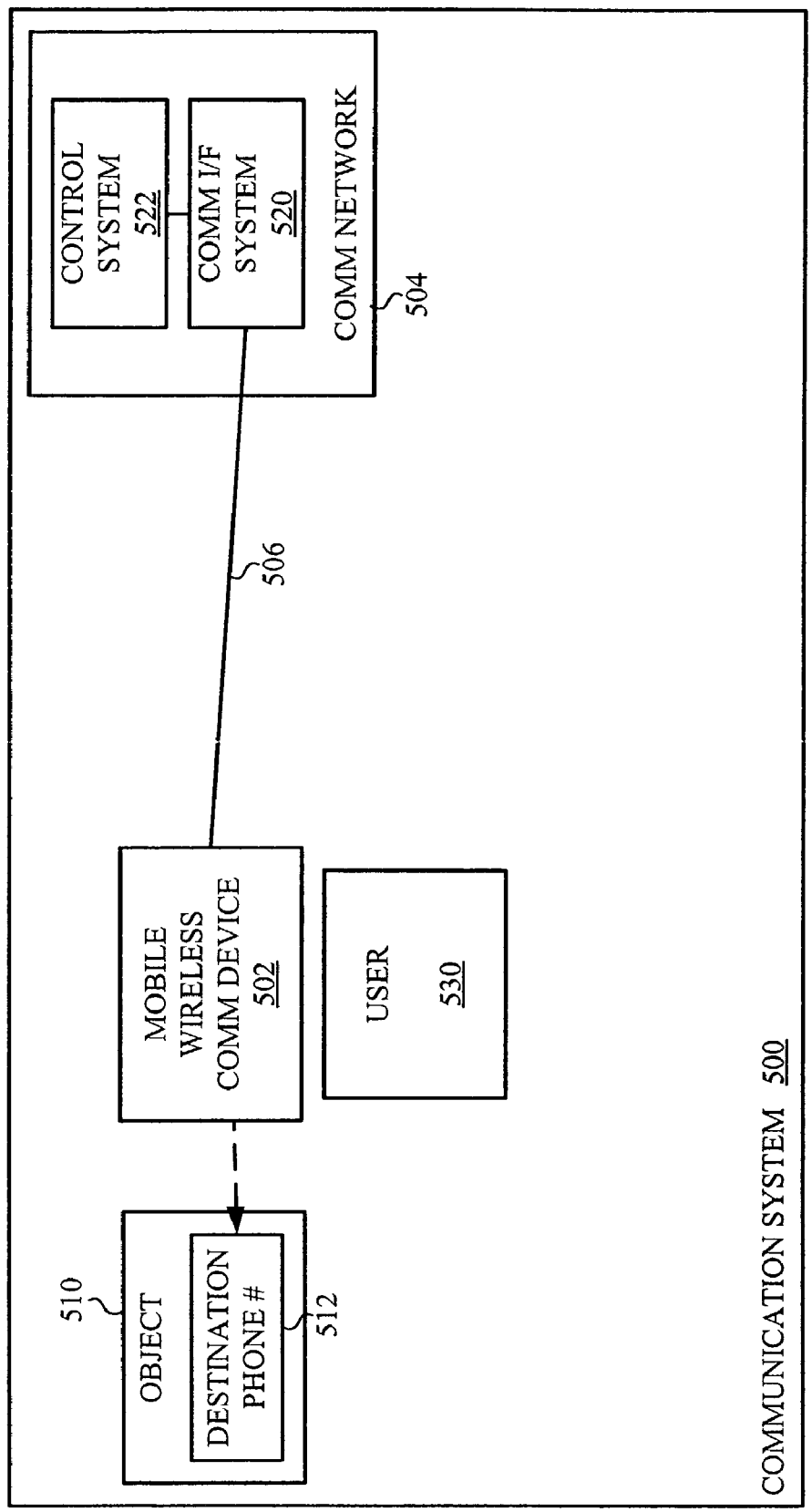
FIG. 5 illustrates a communication network for providing geographic directions in an example of the invention.

Communication Network—FIG. 5

FIG. 5 illustrates a communication system 500 for providing geographic directions in an example of the invention. Communication system 500 is comprised of a mobile wireless communication device 502 and a communication network 504. Communication network 504 is comprised of a communication interface system 520 coupled to a control system 522. FIG. 5 also includes tangible object 510 that can be read by mobile wireless communication device 502. Tangible object 510 includes destination phone number 512 for a destination.

For this example, assume that user 530 needs to go to a destination (not shown) and wants to get directions to the destination. User 530 possesses mobile wireless communication device 502 and has access to object 510 that includes destination phone number 512. User 530 operates mobile wireless communication device 502 to read destination phone number 512 from object 510. Destination phone number 512 could be in the form of a bar code, a magnetic strip, an RFIC, or equivalent means, which can be read by mobile wireless communication device 502. User 530 may also manually enter destination phone number 512. Mobile wireless communication device 502 generates a request for geographic directions and transmits the request, including destination phone number 512, to communication network 504 over wireless link 506.

Communication interface system 520 receives the request for geographic directions from mobile wireless communication device 502. The request includes destination phone number 512. Control system 522 processes destination phone number 512 to determine a location of the destination. Control system 522 processes the location of the destination to generate the geographic directions. Communication interface system 520 transmits the geographic directions to mobile wireless communication device 502 over wireless link 506. Mobile wireless communication device 502 provides the geographic directions to user 530 to facilitate guiding user 530 to the destination. Based on this disclosure, those skilled in the art will appreciate how to modify existing communication networks to make communication network 504.

In one embodiment of the invention, control system 522 transmits a query to a service control point (not shown) for the location of the destination. The query includes the destination phone number. Control system 522 receives a response to the query that includes the location of the destination.

In some embodiments of the invention, the location of mobile wireless communication device 502 is important in addition to the location of the destination. In such cases, mobile wireless communication device 502 determines the location of the mobile wireless communication device 502, possibly by satellite signals. Mobile wireless communication device 502 transmits the location of mobile wireless communication device 502 to communication network 504. Communication interface system 520 receives the location of mobile wireless communication device 502 and control system 522 processes the location of mobile wireless communication device 502 and the location of the destination to generate the geographic directions.

Figure 6:
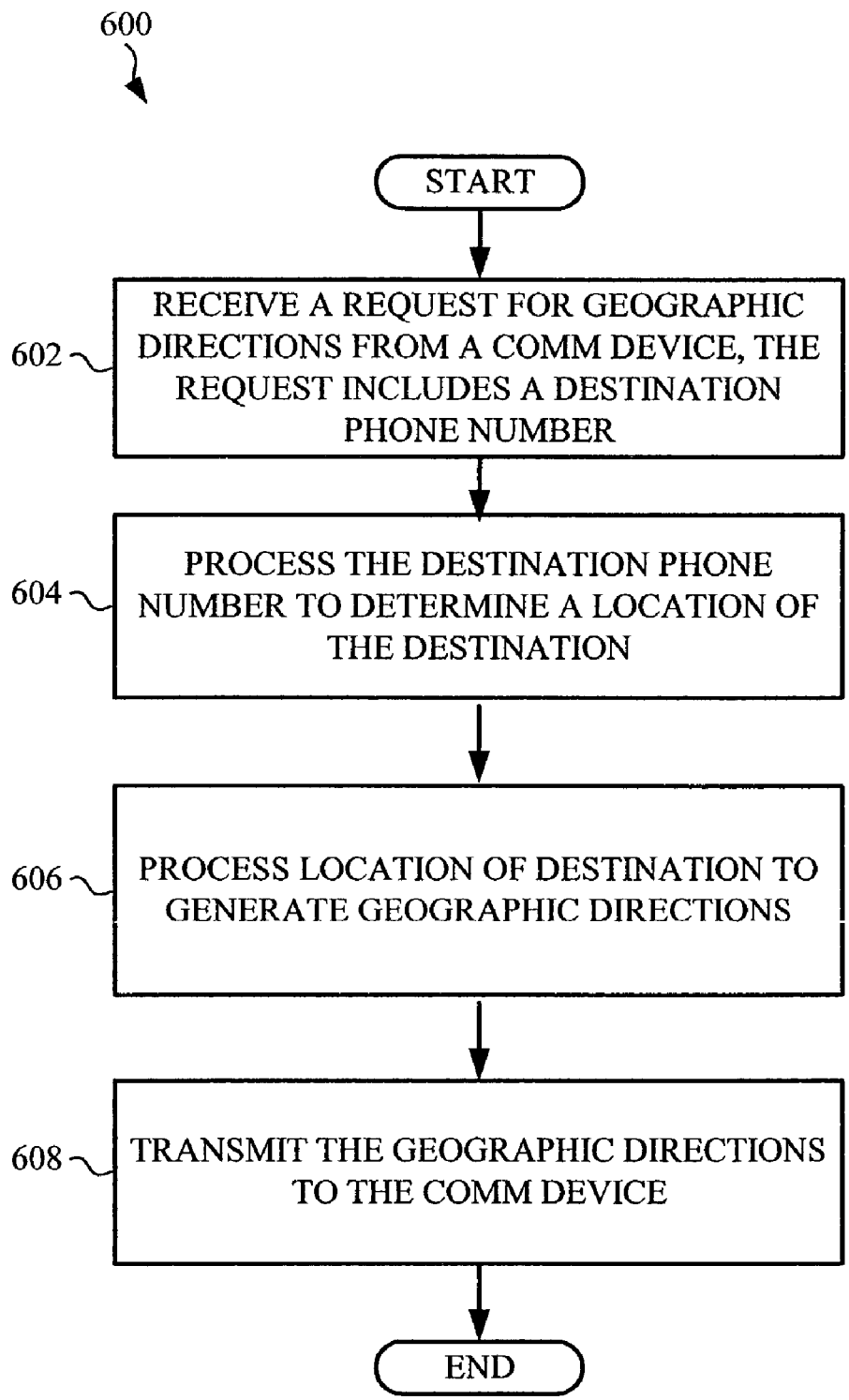
FIG. 6 is a flow chart illustrating a method of operating a communication network to provide geographic directions in an example of the invention.

Method of Operating a Communication Network—FIG. 6

FIG. 6 illustrates a method 600 of operating a communication network for providing geographic directions in an example of the invention. The communication network may be communication network 504 illustrated in FIG. 5. Reference numbers corresponding to FIG. 6 are in parenthesis.

For this method, assume that a user needs to go to a destination and wants to get directions to the destination. The user possesses an object that includes a destination phone number and a mobile wireless communication device. The user operates the mobile wireless communication device to read the destination phone number from the object. The mobile wireless communication device generates a request for geographic directions and transmits the request, including the destination phone number, to a communication network over a wireless link.

The communication network receives the request for geographic directions from the mobile wireless communication device (602). The request includes a destination phone number for the destination. The communication network processes the destination phone number to determine a location of the destination (604). The communication network processes the location of the destination to generate the geographic directions (606). The communication network transmits the geographic directions to the mobile wireless communication device (608).

The systems and methods described in FIGS. 1–6 may be comprised of or performed by instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Figure 7:
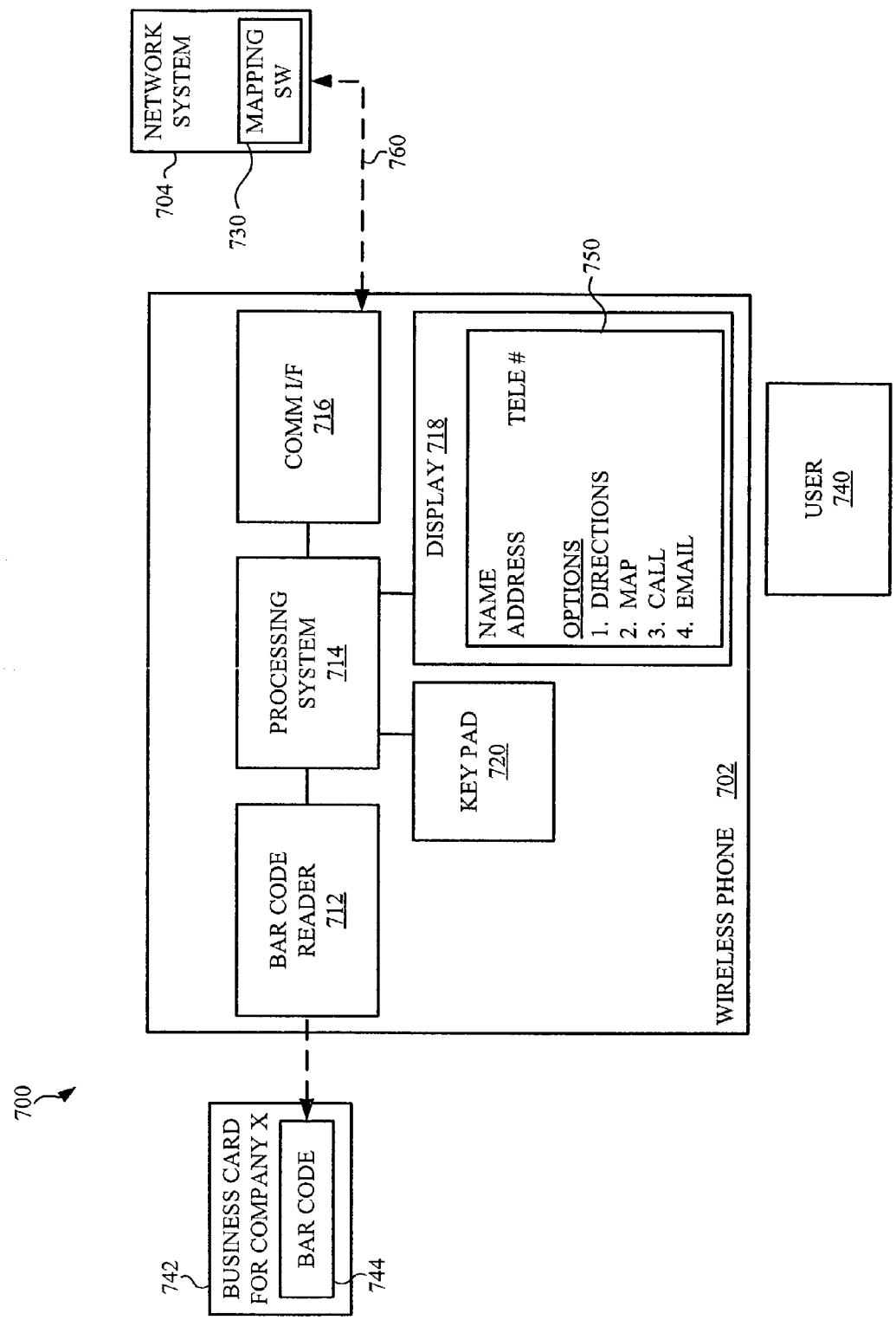
FIG. 7 illustrates a communication system with a wireless phone for providing geographic directions in an example of the invention.

Communication System Providing Geographic Directions—FIG. 7

FIG. 7 illustrates a communication system 700 for providing geographic directions in an example of the invention. Communication system 700 is comprised of wireless phone 702 and network system 704. Wireless phone 702 is comprised of bar code reader 712, processing system 714, communication interface 716, display 718, and keypad 720. Network system 704 is configured to operate mapping software 730. Mapping software 730 may be conventional software or custom software. Network system 704 may provide the wireless communications for wireless phone 702. For instance, wireless phone 702 may be a PCS phone and network system 704 may be a Sprint facility that provides the PCS service to the PCS phone.

For this example, assume that user 740 needs to go to Company X (not shown) and wants to get directions to Company X. Company X had business cards 742 made up and distributed the cards to customers such as user 740. The business cards 742 include bar codes 744 that represent machine-readable information on Company X, such as an address, telephone number, e-mail address, satellite coordinates, or any other information.

To get directions, user 740 operates bar code reader 712 to read bar code 744 from business card 742. Bar code reader 712 transfers bar code data to processing system 714. Assume for this example that the bar code data includes satellite coordinates for Company X. Responsive to receiving the bar code data, processing system 714 generates a menu 750 of options for user 740. Menu 750 may include the name of Company X, the address of Company X, the telephone number for Company X, etc. Menu 750 also includes a list of options, such as "Directions", "Map", "Call", and "E-mail". Using keypad 720, user 740 selects one of the options.

If user 740 selects "Directions", processing system 714 transmits the satellite coordinates for the destination to network system 704 over a wireless link 760 using communication interface 716. Network system 704 executes mapping software 730 to process the satellite coordinates and generate directions to Company X. Network system 704 transmits the directions to processing system 714 over wireless link 760 and through communication interface 716. Processing system 714 then displays the directions to user 740 using display 718. The directions may comprise text messages explaining routes to Company X from major roads.

If user 740 selects "Map", processing system 714 transmits the satellite coordinates for the destination to network system 704 over a wireless link 760 using communication interface 716. Network system 704 executes mapping software 730 to process the satellite coordinates and generate a map illustrating one or more routes to get to Company X. Network system 704 transmits the map to processing system 714 over wireless link 760 and through communication interface 716. Processing system 714 then displays the map to user 740 using display 718. The map may graphically illustrate streets within an area surrounding Company X.

For either of the above selections, mapping software 730 may generate suggested routes for user 740 to take to get to Company X. The suggested routes may depend on the time of day, the day of the week, or real-time data, such as traffic reports, accident reports, or construction reports. Wireless phone 702 may also be configured to determine its own location. For instance, wireless phone 702 may include a satellite receiver that receives satellite coordinates. Processing system 714 would transmit the satellite coordinates of both wireless phone 702 and Company X to network system 704. Mapping software 730 can then generate directions and maps that tell user 740 how to get from his/her current location to the location of Company X.

If user 740 selects "Call", processing system 714 automatically initiates a call to Company X to the number included in the bar code data. If user 740 selects "E-mail", processing system 714 automatically initiates an e-mail message to an e-mail address at Company X included in the bar code data.

Wireless phone 702 may be able to provide other information on Company X based on reading bar code 744. For instance, wireless phone 702 may be able to provide specials offered by Company X, coupons accepted by Company X, news on Company X, and weather in the area of Company X.

Figure 8:
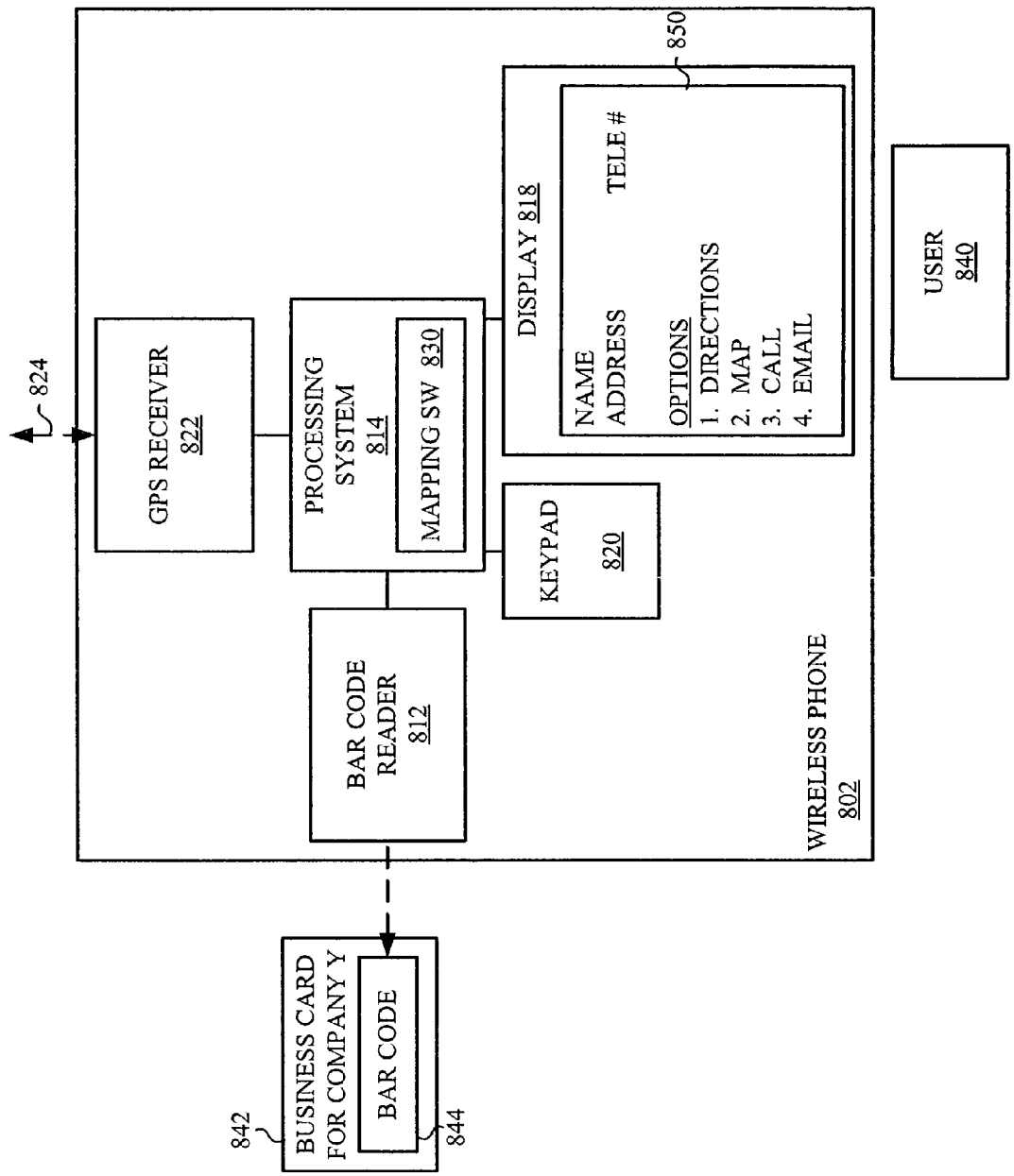
FIG. 8 illustrates a wireless phone for providing geographic directions in an example of the invention.

Wireless Phone Providing Geographic Directions—FIG. 8

FIG. 8 illustrates a wireless phone 802 for providing geographic directions in an example of the invention. Wireless phone 802 is comprised of bar code reader 812, processing system 814, display 818, keypad 820, and satellite receiver 822. Processing system 814 is configured to operate mapping software 830. Mapping software 830 may be conventional software or custom software.

For this example, assume that user 840 needs to go to Company Y (not shown) and wants to get directions to Company Y. Company Y had business cards 842 made up and distributed the cards to customers such as user 840. The business cards 842 include bar codes 844 that represent machine-readable information on Company Y, such as an address, telephone number, e-mail address, satellite coordinates, or any other information.

To get directions, user 840 operates bar code reader 812 to read bar code 844 from business card 842. Bar code reader 812 transfers bar code data to processing system 814. Assume for this example that the bar code data includes satellite coordinates for Company Y. Responsive to receiving the bar code data, processing system 814 generates a menu 850 of options for user 840. Menu 850 may include the name of Company Y, the address of Company Y, the telephone number for Company Y, etc. Menu 850 also includes a list of options, such as "Directions", "Map", "Call", and "E-mail". Using keypad 820, user 840 selects one of the options.

If user 840 selects "Directions", processing system 814 determines the current location of wireless phone 800, and consequently the location of user 840. To determine the current location of user 840, processing system 814 queries satellite receiver 822 for satellite coordinates of user 840. Satellite receiver 822 receives satellite signals 824 and responds to processing system 814 with the satellite coordinates of user 840. Processing system 814 executes mapping software 830 to process the satellite coordinates of Company Y and the satellite coordinates of user 840 and generates directions from the location of user 840 to Company Y. Processing system 814 then displays the directions to user 840 using display 818. The directions may comprise text messages explaining one or more routes between the location of user 840 to Company Y.

If user 840 selects "Map", processing system 814 determines the current location of wireless phone 802, and consequently the location of user 840. To determine the current location of user 840, processing system 814 queries satellite receiver 822 for satellite coordinates of user 840. Satellite receiver 822 receives satellite signals 824 and responds to processing system 814 with the satellite coordinates of user 840. Processing system 814 executes mapping software 830 to process the satellite coordinates of Company Y and the satellite coordinates of user 840 and generates a map illustrating one or more routes between the location of user 840 and Company Y. Processing system 814 then displays the map to user 840 using display 818.

For either of the above selections, mapping software 830 may generate suggested routes for user 840 to take to get to Company Y. The suggested routes may depend on the time of day, the day of the week, or real-time data, such as traffic reports, accident reports, or construction reports.

If user 840 selects "Call", processing system 814 automatically initiates a call to Company Y to the number included in the bar code data. If user 840 selects "E-mail", processing system 814 automatically initiates an e-mail message to an e-mail address at Company Y included in the bar code data.

What is claimed is:

1. A mobile wireless communication device, comprising:
   a reading system configured to read destination data for a destination from a tangible object if the tangible object is positioned in proximity to the reading system;
   a control system configured to transmit a query including the destination data to a service control point of a communication network, receive a response to the query that includes the location of the destination, and process the location of the destination to generate geographic directions to the destination; and
   a user interface system configured to provide the geographic directions to a user of the mobile wireless communication device to facilitate guiding the user to the destination.

2. The mobile wireless communication device of claim 1 wherein the geographic directions comprise street directions to the destination.

3. The mobile wireless communication device of claim 1 wherein the geographic directions comprise a map for illustrating a location of the destination.

4. The mobile wireless communication device of claim 1 wherein the destination data comprises a telephone number of the destination.

5. The mobile wireless communication device of claim 1 wherein the destination data comprises an e-mail address of the destination.

6. The mobile wireless communication device of claim 1 wherein the destination data comprises satellite coordinates of the destination.

7. The mobile wireless communication device of claim 1 wherein the reading system is further configured to read the destination data from a bar code on the tangible object.

8. The mobile wireless communication device of claim 1 wherein the reading system is further configured to read the destination data from a magnetic strip on the tangible object.

9. The mobile wireless communication device of claim 1:
   wherein the control system is further configured to determine a location of the mobile wireless communication device and process the location of the mobile wireless communication device and the location of the destination to generate the geographic directions, wherein the geographic directions comprise a map for illustrating the location of the mobile wireless communication device and a location of the destination.

10. The mobile wireless communication device of claim 1:
    wherein the control system is further configured to determine a location of the mobile wireless communication device and process the location of the mobile wireless communication device and the location of the destination to generate the geographic directions, wherein the geographic directions comprise suggested directions between the location of the mobile wireless communication device and the destination.

11. The mobile wireless communication device of claim 1 wherein the control system is further configured to:
    determine a location of the mobile wireless communication device,
    transfer a request to the communication network, wherein the request includes information on the location of the mobile wireless communication device and the location of the destination,
    receive a response from the communication network, and
    process the response to generate the geographic directions.

12. The mobile wireless communication device of claim 11 wherein the control system is further configured to determine the location of the mobile wireless communication device based on satellite signals.

13. The mobile wireless communication device of claim 1 wherein the mobile wireless communication device comprises a mobile wireless telephone.

14. The mobile wireless communication device of claim 1 wherein the mobile wireless communication device comprises a personal digital assistant.

15. The mobile wireless communication device of claim 1:
    wherein the control system is further configured to generate a menu having a plurality of options;
    wherein the user interface system is further configured to display the menu to the user; and
    wherein the control system is further configured to process the destination data responsive to the user selecting one of the options.

16. A method of operating a mobile wireless communication device, the method comprising:
    reading destination data for a destination from a tangible object if the tangible object is positioned in proximity to the mobile wireless communication device;
    transmitting a query to a service control point of a communication network, wherein the query includes the destination data;
    receiving a response to the query that includes the location of the destination;
    processing the location of the destination to generate geographic directions to the destination; and
    providing the geographic directions to a user of the mobile wireless communication device to facilitate guiding the user to the destination.

17. The method of claim 16 wherein the geographic directions comprise street directions to the destination.

18. The method of claim 16 wherein the geographic directions comprise a map for illustrating a location of the destination.

19. The method of claim 16 wherein the destination data comprises a telephone number of the destination.

20. The method of claim 16 wherein the destination data comprises an e-mail address of the destination.

21. The method of claim 16 wherein the destination data comprises satellite coordinates of the destination.

22. The method of claim 16 wherein reading the destination data comprises:
reading the destination data from a bar code on the tangible object.

23. The method of claim 16 wherein reading the destination data comprises:
reading the destination data from a magnetic strip on the tangible object.

24. The method of claim 16 further comprising:
determining a location of the mobile wireless communication device; and
processing the location of the mobile wireless communication device and the location of the destination to generate the geographic directions, wherein the geographic directions comprise a map for illustrating the location of the mobile wireless communication device and a location of the destination.

25. The method of claim 16 further comprising:
determining a location of the mobile wireless communication device; and
processing the location of the mobile wireless communication device and the location of the destination to generate the geographic directions, wherein the geographic directions comprise suggested directions between the location of the mobile wireless communication device and the destination.

26. The method of claim 16 wherein processing the destination data to provide geographic directions further comprises:
determining a location of the mobile wireless communication device,
transferring a request to the communication network, wherein the request includes information on the location of the mobile wireless communication device and the location of the destination,
receiving a response from the communication network, and
processing the response to generate the geographic directions.

27. The method of claim 26 further comprising determining the location of the mobile wireless communication device based on satellite signals.

28. The method of claim 16 wherein the mobile wireless communication device comprises a mobile wireless telephone.

29. The method of claim 16 wherein the mobile wireless communication device comprises a personal digital assistant.

30. The method of claim 16 further comprising:
generating a menu having a plurality of selections;
displaying the menu to a user; and
processing the destination data responsive to the user selecting one of the selections.

31. A communication system for providing geographic directions to a destination to a user, the communication system comprising:
a mobile wireless communication device configured to read destination data for the destination from a tangible object if the tangible object is positioned in proximity to the mobile wireless communication device, and transmit the destination data over a wireless link; and
a network system configured to receive the destination data, process the destination data via a service control point to generate a location of the destination process the location of the destination to generate the geographic directions to the destination, and transmit the geographic directions over the wireless link;
the mobile wireless communication device further configured to receive the geographic directions and display the geographic directions to a user to facilitate guiding the user to the destination.

32. The communication system of claim 31 wherein the geographic directions comprise a map illustrating a location of the destination.

33. The communication system of claim 31 wherein the geographic directions comprise suggested directions to the destination.

34. The communication system of claim 31 wherein the mobile wireless communication device is further configured to:
scan a bar code on the tangible object to read the destination data.

35. The communication system of claim 31 wherein the mobile wireless communication device is further configured to:
read a magnetic strip on the tangible object to read the destination data.

36. The communication system of claim 31 wherein the mobile wireless communication device comprises a wireless phone.

37. The communication system of claim 31 wherein the mobile wireless communication device comprises a personal digital assistant.

38. The communication system of claim 31 wherein:
the mobile wireless communication device is further configured to determine a location of the mobile wireless communication device, and transmit the location of the mobile wireless communication device over the wireless link; and
the network system is further configured to process the location of the destination and the location of the mobile wireless communication device to generate the geographic directions.

39. The communication system of claim 38 wherein the mobile wireless communication device is further configured to:
receive satellite signals; and
process the satellite signals to determine the location of the mobile wireless communication device.

40. A method of providing geographic directions to a destination, the method comprising:
reading destination data for the destination from a tangible object if the tangible object is positioned in proximity to a mobile wireless communication device;
transmitting the destination data from the mobile wireless communication device to a network system over a wireless link;
processing the destination data via a service control point of the network system to generate a location of the destination;
processing the location of the destination in the network system to generate the geographic directions to the destination;
transmitting the geographic directions from the network system to the mobile wireless communication device over the wireless link; and
displaying the geographic directions to a user of the mobile wireless communication device to facilitate guiding the user to the destination.

41. The method of claim 40 wherein the geographic directions comprise a map illustrating a location of the destination.

42. The method of claim 40 wherein the geographic directions comprise suggested directions to the destination.

43. The method of claim 40 wherein reading the destination data from the tangible object comprises:
scanning a bar code on the tangible object to read the destination data.

44. The method of claim 40 wherein reading the destination data from the tangible object comprises:
reading a magnetic strip on the tangible object to read the destination data.

45. The method of claim 40 wherein the mobile wireless communication device comprises a wireless phone.

46. The method of claim 40 wherein the mobile wireless communication device comprises a personal digital assistant.

47. The method of claim 40 further comprising:
determining a location of the mobile wireless communication device; and
processing the location of the destination and the location of the mobile wireless communication device in the network system to generate the geographic directions.

48. The method of claim 47 wherein determining a location of the mobile wireless communication device comprises:
receiving satellite signals in the mobile wireless communication device; and
processing the satellite signals in the mobile wireless communication device to determine the location of the mobile wireless communication device.

49. A communication network, comprising:
a communication interface system configured to receive a request for geographic directions to a destination from a mobile wireless communication device over a wireless link, wherein the request includes a phone number for the destination, and wherein the mobile wireless communication device is configured to read the phone number from a tangible object positioned in proximity to the mobile wireless communication device; and
a control system configured to transmit a query including the phone number to a service control point, receive a response to the query that includes a location of the destination, and process the location of the destination to generate the geographic directions;
the communication interface system further configured to transmit the geographic directions to the mobile wireless communication device over the wireless link.

50. The communication network of claim 49:
wherein the communication interface system is further configured to receive a location of the mobile wireless communication device from the mobile wireless communication device; and
wherein the control system is further configured to process the location of the mobile wireless communication device and the location of the destination to generate the geographic directions.

51. A method of operating a communication network, the method comprising:
receiving a request for geographic directions to a destination from a mobile wireless communication device over a wireless link, wherein the request includes a phone number for the destination, and wherein the mobile wireless communication device is configured to read the phone number from a tangible object positioned in proximity to the mobile wireless communication device;
transmitting a query to a service control point wherein the query includes the telephone number;
receiving a response to the query that includes a location of the destination;
processing the location of the destination to generate the geographic directions; and
transmitting the geographic directions to the mobile wireless communication device over the wireless link.

52. The method of claim 51 further comprising:
receiving a location of the mobile wireless communication device from the mobile wireless communication device; and
processing the location of the mobile wireless communication device and the location of the destination to generate the geographic directions.

* * * * *